United States Patent [19]

Towlson

[11] Patent Number: 4,721,881

[45] Date of Patent: Jan. 26, 1988

[54] NEUTRALIZING ELECTRODE FOR SCHLIEREN DARK FIELD LIGHT VALVE

[75] Inventor: Howard E. Towlson, Baldwinsville, N.Y.

[73] Assignee: General Electric Company, Princeton, N.J.

[21] Appl. No.: 877,903

[22] Filed: Jun. 24, 1986

[51] Int. Cl.⁴ .............................................. H01J 29/12
[52] U.S. Cl. ................... 313/465; 350/361; 358/62; 358/233
[58] Field of Search ................ 313/465; 358/60, 62, 358/231, 233; 350/361, 267, 269

[56] References Cited

U.S. PATENT DOCUMENTS 3,874,786  4/1975  Towlson .................. 313/465 X

*Primary Examiner*—David K. Moore
*Assistant Examiner*—K. Wieder
*Attorney, Agent, or Firm*—Eugene M. Whitacre; Vincent J. Coughlin, Jr.

[57] ABSTRACT

A neutralizing electrode is provided in a light valve of the Schlieren dark field type. The purpose of this neutralizing electrode is to neutralize the large electrostatic forces which develop between the transparent conductive electrode on the rotating disc and the face plate of the light valve causing erratic rotational motion of the disk. The neutralizing electrode is connected to a source of potential which is of the same polarity and substantially the same potential as that of the rotating disk electrode.

8 Claims, 6 Drawing Figures

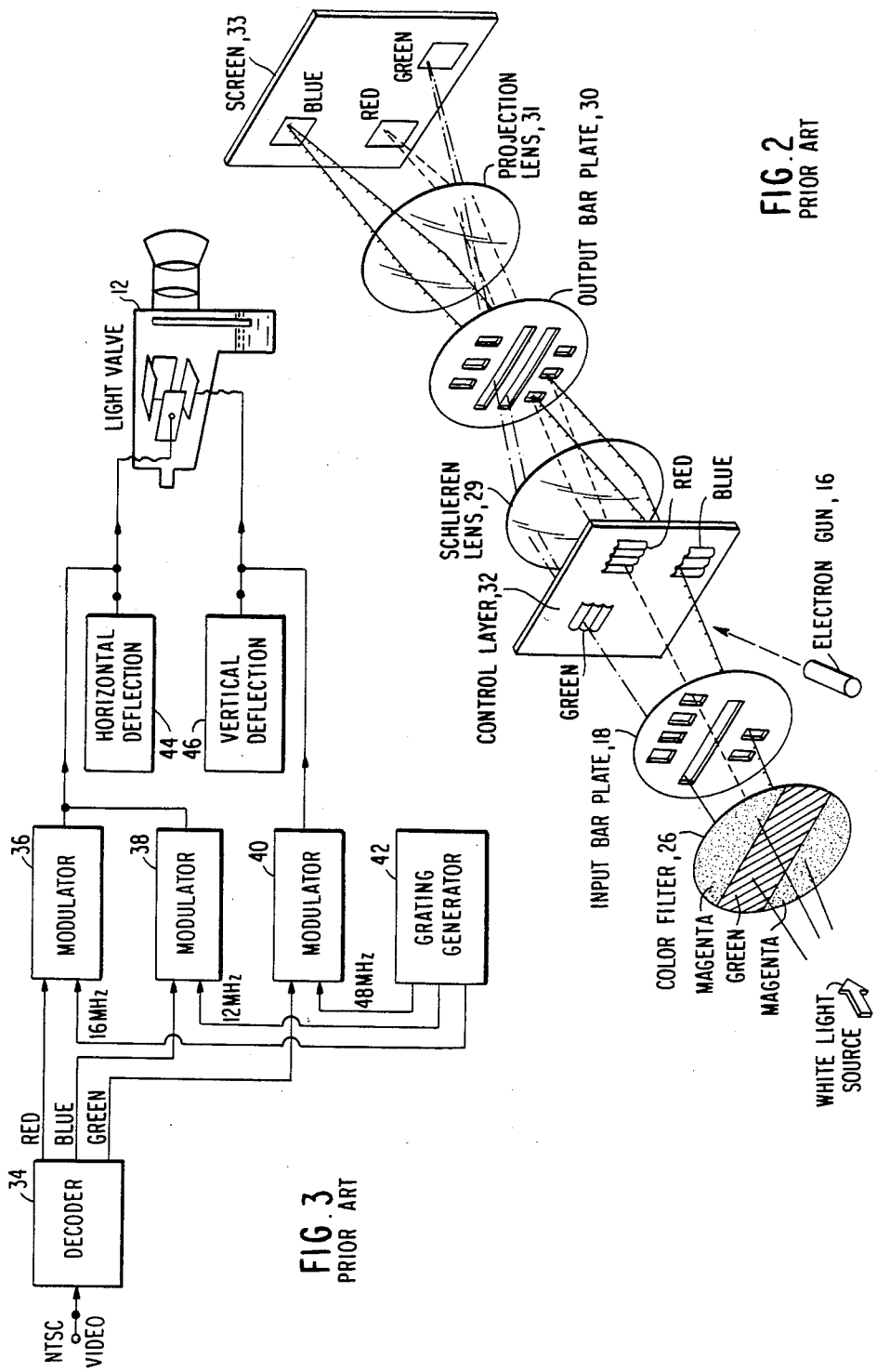

NEUTRALIZING ELECTRODE FOR SCHLIEREN DARK FIELD LIGHT VALVE

BACKGROUND OF THE INVENTION

1. Field of the Invention

The present invention generally relates to improvements in light valve projection systems of the Schlieren dark field type and, more particularly, to an improvement in the mechanical operation of light valves of the type.

2. Description of the Prior Art

Light valve projection systems of the Schlieren dark field type have been in commercial use for many years and are capable of providing excellent performance. Typical prior art color projection systems of this type are shown in U.S. Pat. Nos. 3,290,436, 3,352,592 and 3,437,746, all of which were issued to W. E. Good et al. The principles of operation of this type of projection system are briefly described with reference to FIGS. 1, 2 and 3 of the drawings.

With reference first to FIG. 1, there is schematically shown a single-gun television light valve assembly comprising a lamp 10, sealed light valve 12, and Schlieren projection lens 14. The sealed light valve 12 comprises a glass envelope which contains an electron gun 16, input slots 18, focus-deflection system 20, a control layer 32 on a rotating disk 22, and a fluid reservoir 24.

The electron gun 16 generates, from anode aperture 11, an electron beam which is used to "write" charge patterns on the control layer 32. These patterns create surface deformations in the layer and form light diffraction gratings. The electron beam is focused, deflected, and modulated by electrodes 23, 25, 27, and 21. The control layer surface deformations diffract and modulate the light rays passing through the layer 32 and disk 22.

The focus-deflection system 20 comprises three electrode sets each having four orthogonal electrodes, which form three electrode "boxes", referred to as boxes 23, 25 and 27, and a cylindrical electrode 21. The first of these, box 23, is arranged about the aperture in the input window and serves to center and allow pre-deflection of the electron beam. The next two boxes, boxes 25 and 27, have DC and AC voltages applied to them in a manner to achieve a uniformly focused electron beam image of aperture 11 which is scanned across the raster plane on control layer 32. This, in turn, permits the control layer fluid to be modulated uniformly by charge control to produce a uniformly colored projected image. Following the focus-deflection boxes 25 25 and 27 is a drift ring 21 which serves, with a transparent electrode on disk 22, as an element of the final electron lens in the focus-deflection system 20.

Specific examples of light modulating fluids are disclosed in U.S. Pat. No. 3,288,927 to Ralph W. Plump, U.S. Pat. Nos. 3,317,664 and 3,317,665 both to Edward F. Perlowski, Jr., U.S. Pat. No. 3,541,992 to Carlyle S. Herrick et al, and U.S. Pat. No. 3,761,616 issued to C. E. Timberlake. These fluids may include additives as taught by U.S. Pat. Nos. 3,764,549 and 3,928,394 to David A. Orser. In general, the control layer or light modulating fluid is a very special chemical compound, modified with special additives, having the electro-mechanical and visco-elastic properties needed to produce effective control layer properties in the electron beam addressed light valve.

The basic light collection system includes an arc lamp 10, which may be a Xenon lamp, the arc of which is located at the focus of a reflector system, which may be a simple ellipsoidal reflector, as shown, or a compound reflector, as disclosed for example in U.S. Pat. No. 4,305,099 to Thomas T. True et al. The light from the arc is reflected from the reflector through a pair of spaced lens plates having corresponding pluralities of rectangular lenticules arranged in horizontal rows and vertical columns. The first lens plate is shown in FIG. 1 at 28 and the second lens plate is formed on the light input surface of the glass envelope of the light valve 12. The light from the lamp 10 is projected through a color filter plate 26 and the lenticular lens 28 before entering the light valve 12.

The interior surface of the glass envelope of the light valve 12 carries the input light mask in the form of slots 18 which, for example, may be applied by vapor deposition. The input slots 18 are a series of transparent slots and alternating opaque bars in a pattern generally as indicated in FIG. 1. The filtered light from the lamp 10 passes into the light valve 12 through these transparent slots. The lenslets of the lenticular lens 28 and the corresponding lenslets, formed on the light input surface of the glass envelope of the light valve 12, form condensing lens pairs which first focus spots of filtered light onto the slots of the light mask and then re-image the light rays onto the control layer raster plane 32. With this arrangement, efficient utilization is made of light from the arc lamp, and uniform distribution of light is produced, in a rectangular pattern, on the light modulating medium or control layer 32.

The Schlieren projection lens 14 includes Schlieren lens elements 29, output color selection bars 30 and a projection lens system 31. The output selection bars 30 are the complement of the input slots 18. That is, on the output bar plate, the bars are optically aligned with the slots of the input slots 18 so that, in the absence of a diffraction of light passing through the control layer 32, light rays are focused and terminated on the bars of the output bar plate. This creates a "dark field" condition, i.e., no light is transmitted in the absence of a modulating signal superimposed on the raster scanning signals applied to the horizontal and vertical deflection plates of the deflection system 20. It should be noted, however, that the electron beam which scans the raster and provides charge to the control layer is a constant current electron beam, there being no modulation of the intensity of the beam produced by the electon gun 16 (other than during the horizontal and vertical retrace intervals when the beam is off).

The lower half of FIG. 1 shows the cross sections of the light body and light valve components. The spectral diagrams at the bottom indicate how the light is prefiltered before entering the light valve.

FIG. 2 is a simplified light valve diagram showing the color selection action of the three basic gratings. The control layer 32 which is supported by the rotating disk 22 (shown in FIG. 1) is illustrated as having three different diffraction gratings for red, green and blue light components. It should be understood that disk 22 is made of glass and, on the side facing electron gun 16, has a transparent electrode surface which is electrically connected to a source of positive potential with respect to the cathode of the light valve. Disk 22, and its transparent electrode, are coated with a layer of deformable fluid which forms the control layer 32. Electron charge patterns from the electron beam are deposited on the surface of the control layer 32 and are acted upon by the electric field from the disk electrode to deform the surface of the control layer, forming diffraction gratings. These diffraction gratings may be written individually or simultaneously and normally are actually superimposed but, for purposes of illustration only, they are shown in FIG. 2 as separated on the control layer 32.

In the light valve projection system shown in FIGS. 1 and 2, green light is passed through the horizontal slots of the input bar plate 18 and is controlled by diffraction gratings formed by modulating the height of the scanned raster lines on the control layer 32. This is done by controlling the amplitude of a high frequency carrier applied to the vertical deflection plates as modulated by the green video signal as shown in FIG. 3. Magenta (red and blue) light is passed through the vertical slots of the input bar plate 18 and is controlled by charge generated diffraction gratings created at right angles to the raster lines by velocity modulating the electron spot as it is scanned in the horizontal direction. In the example shown in FIG. 3, this is done by applying a 16 MHz (12 MHz for blue) signal to the horizontal deflection plates and modulating it with the red video signal as shown in FIG. 3. The grooves created in the control layer 32 have the proper spacing to diffract the red portion of the spectrum through the vertical output slots in plate 30 while the blue portion is blocked. (When the 12 MHz carrier is used, the blue light is passed by the vertical slots in plate 30 and the red light is blocked.)

Thus, three simultaneous and superimposed primary color pictures can be written with the same electron beam and projected to the screen 33 as a completely registered full color picture. Colors are created by writing minature diffraction gratings within each picture element on the fluid surface by manipulating the single scanning electron beam. These gratings diffract the transmitted light rays away from their terminations at the output bars where they are spatially filtered to let the desired color reach the screen. The amount of light diffracted is dependent on the depth of the gratings formed in the control layer. This technique permits a full color television picture to be written on a single control layer with no need for further registration.

FIG. 3 shows in block diagram form the basic light valve projector circuitry. A composite video signal is supplied to the input of a decoder 34 which provides at its output red, blue and green video signals. These signals are respectively applied to modulators 36, 38 and 40. A grating generator 42 supplies carrier signals which, in the case illustrated, have frequencies of 16 MHz and 12 MHz, respectively, to modulators 36 and 38 and a signal having a frequency of 48 MHz to modulator 40. The outputs of the red and blue modulators 36 and 38 are combined and superimposed on the horizontal deflection signal from the horizontal deflection signal generator 44. The output of the green modulator 40 is superimposed on the vertical deflection signal from the vertical deflection generator 46.

The basic Schlieren dark field light valve projector as schematically illustrated in FIGS. 1, 2 and 3 has evolved over a period of years to be a highly efficient projector producing excellent quality pictures of good color balance and high resolution. However, in an improved version featuring a more compact construction than prior versions, a problem has been encountered in that the rotating disk occasionally ran erratically, stopping in some cases, and generating large amounts of wear material from the disk support pads and disk drive gear system. In order to make this improved version run satisfactorily, it was necessary to find a solution to this erratic operation of the disk.

SUMMARY OF THE INVENTION

It is an object of this invention to provide improvements in the design and manufacture of light valve projection systems of the Schlieren dark field type.

It is a another more specific object of the invention to provide a Schlieren dark field type of light valve of compact construction in which the rotating disk runs freely and predictably.

It is a further object of the present invention to provide a simple and inexpensive means of neutralizing the electostatically created forces which effectively impede the rotation of the disk and increase the mechanical wear factors in the light valve.

In investigating the problem of erratic rotation of the disk in the new compact light valve, it was discovered that when a potential difference was applied between the conductive coating on the rotating disk and an external reference surface such as the face plate heater shield, that a force slowly built up which made the disk rotation difficult. It is believed that the electrostatic forces acting across the disk and support pads caused high frictional forces at the points where the disk support pads contact the vacuum/fluid side of the output window. In some cases, the forces were so great as to even stop rotation of the disk.

According to the invention, a conductive electrode is placed between the rotating disk and an external grounded electrode which is adjacent the glass component 58. The grounded electrode may be the shield and electrical resistance mat heaters used to maintain the temperature of the light modulating fluid in the light valve reservoir or the metal mounting frame. This inner face panel conductive film is connected electrically to the rotating disk's conductive surface. In this way, the electrical potential of the disk and the inner face panel is the same, and there is no longer an electrostatic force pulling the disk towards the face plate.

BRIEF DESCRIPTION OF THE DRAWINGS

The foregoing and other objects, aspects and advantages of the invention will be better understood from the following detailed description with reference to the drawings, in which:

FIG. 2 is a simplified perspective view illustrating the principles of operation of the prior art light valve projection system;

FIG. 3 is a block diagram showing the basic circuitry of a modulated deflection system of the prior art light valve projection system;

DETAILED DESCRIPTION OF THE PREFERRED EMBODIMENT OF THE INVENTION

Figure 4:
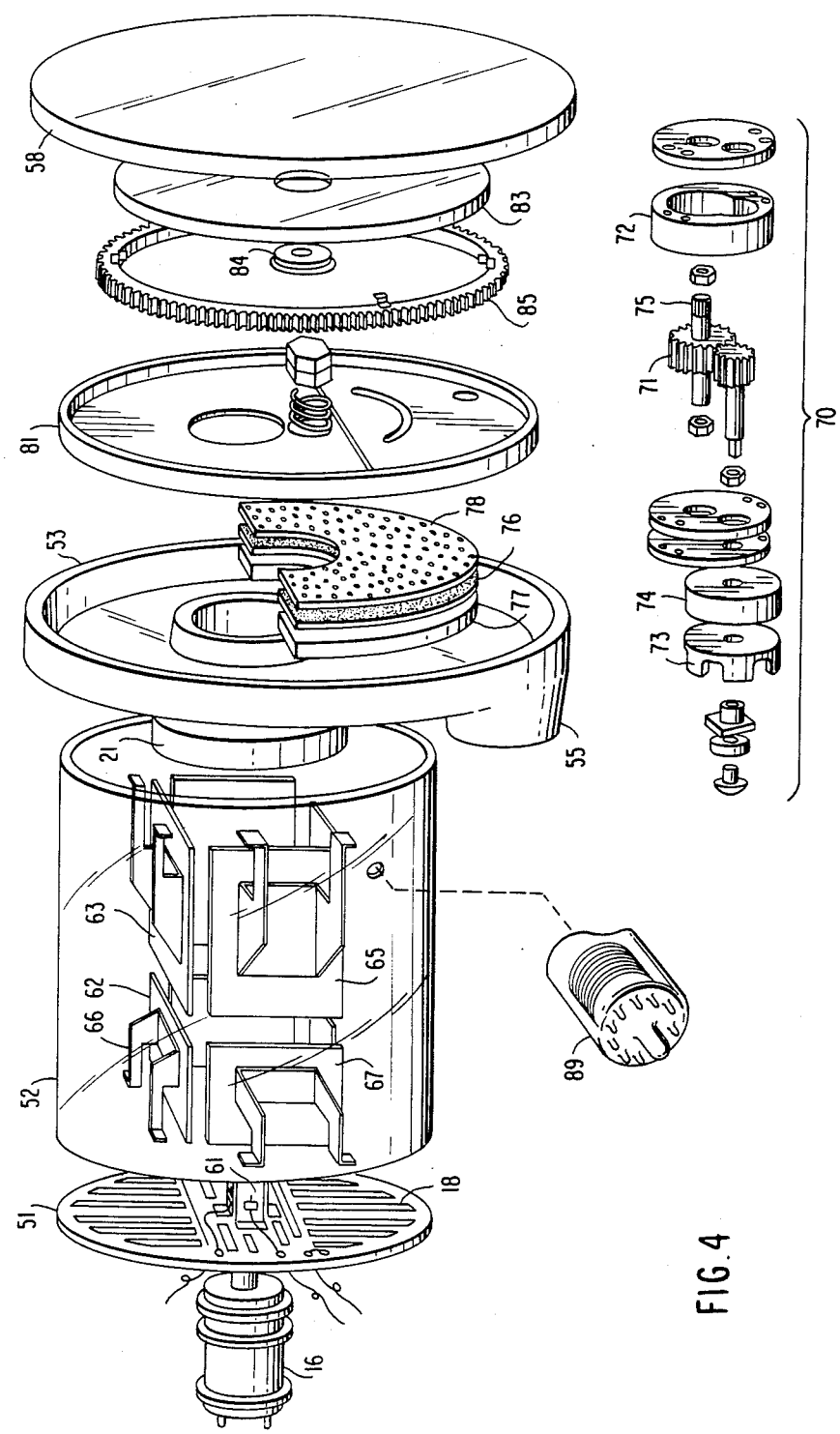
FIG. 4 is an exploded perspective view of major elements of a new generation of light valves which embody the invention.

In the drawings, like reference numerals used in the several figures indicate the same or corresponding components. Referring again to the drawings, and more particularly to FIG. 4, there is shown an exploded view of the internal vacuum components of the new generation Schlieren dark field light valves. The vacuum enclosure comprises an input window 51, a focus deflection cylinder 52, a rear housing 53 which has a molded recess 55 for receiving a pump assembly 70, and a face plate 58. The electron gun assembly 16 is attached to a central aperture of the input window 51, and the input slots or bar plate 18 are formed on the interior surface of the input window 51, functionally similar to the earlier light valves of this type.

The focus and deflection assembly comprises three sets of electrodes. One set of four electrodes 61, comprising a pair of horizontal plates and a pair of vertical plates, is attached to the input window 51 about its central aperture. A pair of vertical deflection plates 62 and a pair of horizontal deflection plates 67 located within the cylinder 52 form the second set. The third set is comprised of the vertical deflection plates 63 and the horizontal deflection plates 65. As shown in FIG. 4, the deflection plates 62, 63, 65, and 67 are supported within the cylinder 52 by means of brackets 66 which also provide the electrical connections to the deflection plates. Beyond the deflection plates 63 and 65 and within the rear housing 53 is a cylindrical drift ring 21 which, with a transparent electrode layer on the electron gun side and peripheral edge of the disk 83, completes the focus-deflection system.

A gear pump assembly, generally indicated at 70, is located within recess 55 of the rear housing 53. The gear pump comprises gears 71 within a housing 72 driven by a magnet 73. The magnet 73 is coupled to a rotating magnet driven by an electric motor (not shown) axially aligned with the pump 70 on the exterior rear face of the recess 55 that houses the pump. An axial shield 74 is provided for the magnet 73 so that its magnetic field does not affect the electron beam. Other magnetic shielding is provided within the light valve projection system to prevent the electron beam from being affected by magnetic fields at the projector or due to the earth's magnetic field.

Figure 1:
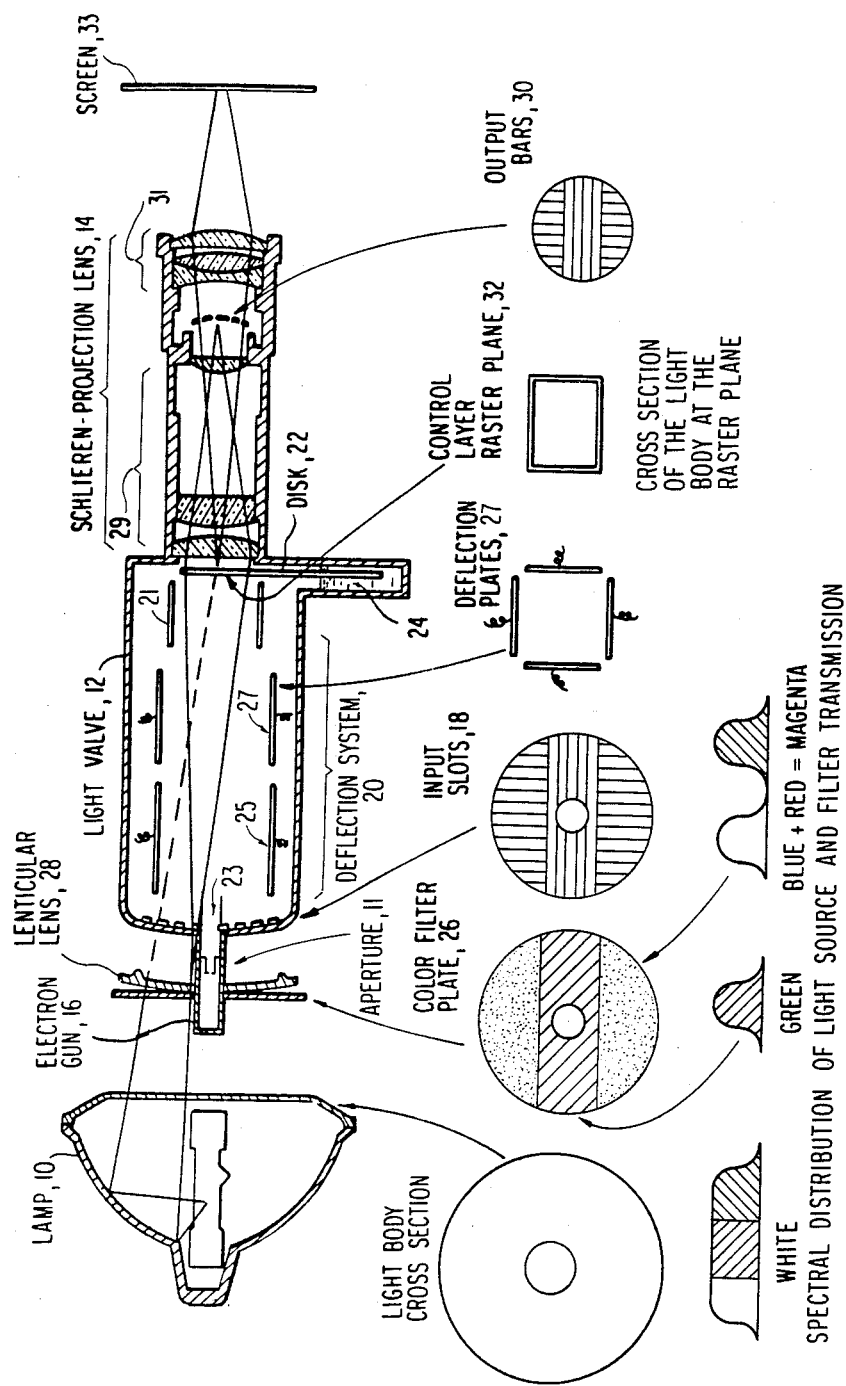
FIG. 1 is a simplified cross-sectional view showing the construction of a prior art light valve projection system.

The rear housing 53, including the recess 55 which houses the pump assembly 70, and the face plate 58 generally define the reservoir 24 (schematically illustrated in FIG. 1) which contains the fluid. The gear pump 70 is located in that reservoir and operates to pump the fluid through a filter 76. The filter 76 is sandwiched between a filter housing 77 and a perforated panel 78, and this assembly is secured to the lower rear face of a baffle 81. The baffle 81 is a generally circular disk with a forwardly projecting flange which surrounds the rotating disk 83. The disk 83 is supported for rotation by a bearing 84 through which projects a pin mounted in the center of baffle 81. A ring gear 85 is attached to the peripheral edge of the disk 83 and is driven by a pinion gear 75 that projects from the gear pump 70.

Attached to the side of the cylinder 52 is a vacuum maintenance device 89, which collects gaseous materials remaining in the envelope after it is sealed and which are generated as a product of the operation of the light valve.

Figure 5:
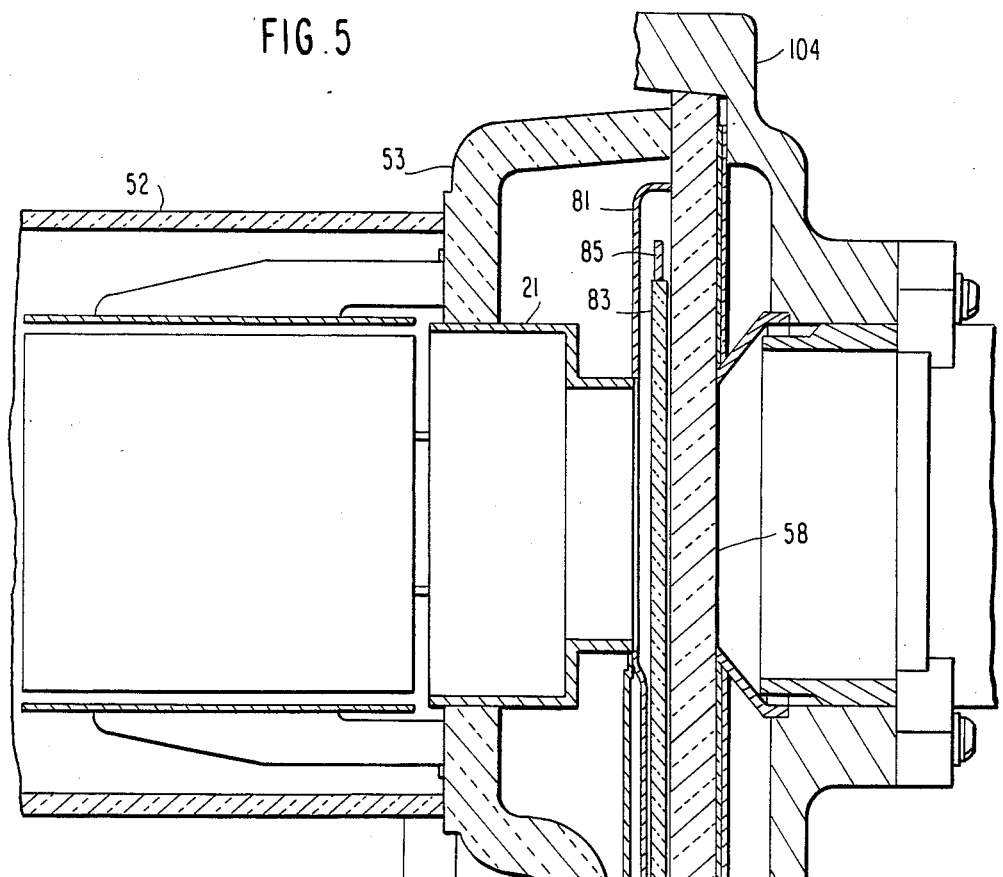
FIG. 5 is an enlarged cross-sectional view of a portion of the light valve showing the face plate, the rotating disk and the metal frame which holds the light valve.

Referring now to FIG. 5, the disk 83 and the output window 58 are shown in closely spaced relation. The light valve mounting hardware 104, electrical mat heater 100, and the heater shielding electrode 102, which operates at ground potential, are shown.

Figure 6:
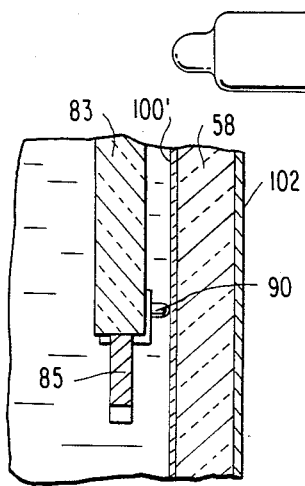
FIG. 6 is a further enlargement of a portion of FIG. 5 showing the output window, the disk support pad, the disk and conductive electrodes associated with these components.

In FIG. 6, a small section of the disk-to-output-window space is shown in a cross-sectional view illustrating one of the three supporting pads 90 which are mounted on disk 83 and serve to establish the spacing between the inside face of the window 58 to the disk 83. The distance between the disk and the output window is approximately 3.5 mils. The potential difference between the conductive surface of the disk 83 and the grounded shielding electrode 102 on the outside of the output window 58 results in strong electrostatic forces between the two parallel plates. Perhaps more importantly, the support pads 90 are electrically connected to the conducting layer on the disk 83 and are essentially in direct contact with the inner surface of window 58. Thus, the three support pads present an area of very high field strength between the grounded electrode on the outside of the window 58 and the potential on disk 83. The electrostatic force between the disk and the output window is the sum of force vectors over the entire area of the disk plus the high forces at each of the three support pads. The nature and properties of the light modulating fluid, essentially an insulating dielectric material, also appear to play a part in the distribution and amplitude of the attractive forces exerted between the disk and the output window. The total force is dependent on the electric field strength which develops between the two electrodes as charge distributes itself through the dielectric materials in the disk-to-window space. This force results in pressure at the pad-to-window contact area and acts to produce a mechanical load, or torque, opposing the turning movements of the disk.

In an initial embodiment of the invention, an electrode was placed on the outside of the window 58, insulated from the shield electrode 102, and connected to a source of potential equal to that of the rotating disk. This procedure was done to prove the feasibility of the invention to serve as a retrofit to already constructed light valves. This approach demonstrated that the solution according to the invention substantially eliminated the tendency toward erratic running of the disk due to electrostatic forces. A similar test, on prior art light valves in which these forces are far weaker, showed an improvement in disk rotating torque.

In the preferred embodiment of the invention to be applied to improved light valves, the inside surface of the output window 58 is coated with a conductive coating 100', as shown in FIG. 6. This coating is connected to a source of potential equal to that of the rotating disc thereby neutralizing the electrostatic charges which formerly produced the attractive forces on the rotating disk and support pads.

While the invention has been described in terms of two embodiments, one a retrofit and the other a preferred construction in new light valves, those skilled in the art will appreciate that the invention can be practiced with modifications within the spirit and scope of the appended claims.

Having thus described my invention, what I claim as new and desire to secure by Letters Patent is as follows:

1. In a light valve of the Schlieren dark field type having a transparent electrode on a rotatable disk spaced from an output window, means for applying a first potential to said electrode on said rotatable disk, the space between said rotatable disk and the output window being filled with a fluid, the improvement comprising:

a neutralizing electrode on said output window; and
   means for connecting said neutralizing electrode to a second potential substantially equal to the potential on said rotatable disk, to provide a field-free region therebetween to reduce erratic rotation of said disk.

2. The improvement in a light valve as recited in claim 1 wherein the neutralizing electrode is a conductive coating on an inside surface of said output window.

3. The improvement in a light valve as recited in claim 1 wherein the neutralizing electrode is placed on an outside surface of said output window.

4. The improvement in a light valve as recited in claim 3 wherein the neutralizing electrode is a conductive coating on an outside surface of said output window.

5. In a Schlieren dark field light valve including:

a vacuum envelope having an input window, a focus deflection cylinder, a rear housing, and a face plate including an output window, a portion of the space between said rear housing and said face plate defining a reservoir;
   a focus and deflection assembly supported within said focus deflection cylinder;
   a rotatable disk having a transparent electrode supported to partially project into said reservoir;
   a fluid in said reservoir for coating said rotatable disk and filling the space between said rotatable disk and said face plate; and
   means for applying a first potential to said electrode on said rotatable disk; the improvement comprising
   a neutralizing electrode on said face plate essentially parallel to said rotatable disk; and
   means for connecting a second potential, substantially equal to said first potential, to said neutralizing electrode to provide a field-free region between said rotatable disk and said neutralizing electrode to reduce erratic rotation of said disk.

6. The improved light valve recited in claim 5 wherein said neutralizing electrode is a conductive coating on an inside surface of said face plate.

7. The improved light valve recited in claim 5 wherein said neutralizing electrode is applied to an outside surface of said face plate.

8. A method of neutralizing the electrostatic forces between a transparent electrode on a rotatable disk and an output window of a light valve of the Schlieren dark field type during the operation thereof comprising the steps of:

applying a first potential to said transparent electrode on said rotatable disk;
   providing a nuetralizing electrode on said output window; and
   applying a second potential to said neutralizing electrode, said second potential being substantially equal to said first potential applied to said transparent electrode on said rotatable disk thereby neutralizing said electrostatic forces which impede the rotation of said disk.

* * * * *